(12) United States Patent
Wormald et al.

(10) Patent No.: US 9,143,900 B2
(45) Date of Patent: *Sep. 22, 2015

(54) SYSTEM AND METHOD FOR PROVIDING TRAFFIC NOTIFICATIONS TO MOBILE DEVICES

(71) Applicant: BlackBerry Limited, Waterloo (CA)

(72) Inventors: Christopher R. Wormald, Kitchener (CA); Arcangelo Loberto, Cambridge (CA); Raymond Reddy, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/326,106

(22) Filed: Jul. 8, 2014

(65) Prior Publication Data

US 2014/0323158 A1 Oct. 30, 2014

Related U.S. Application Data

(63) Continuation of application No. 13/720,312, filed on Dec. 19, 2012, now Pat. No. 8,781,451, which is a continuation of application No. 12/333,495, filed on Dec. 12, 2008, now Pat. No. 8,351,912.

(51) Int. Cl.
*H04L 29/06* (2006.01)
*H04W 24/00* (2009.01)
(Continued)

(52) U.S. Cl.
CPC ............ *H04W 4/046* (2013.01); *G08G 1/0112* (2013.01); *G08G 1/0967* (2013.01); *G08G 1/0969* (2013.01); *G08G 1/096716* (2013.01);
(Continued)

(58) Field of Classification Search
None
See application file for complete search history.

(56) References Cited

U.S. PATENT DOCUMENTS 6,012,012 A 1/2000 Fleck et al.
6,587,777 B1 7/2003 St. Pierre
(Continued)

FOREIGN PATENT DOCUMENTS

EP 1657692 A1 5/2006
WO WO 00/31705 A2 6/2000
(Continued)

OTHER PUBLICATIONS

Farooq, S.; "Researchers Test GPS—Cell Phone Navigation in South Bay"; NBC11.com; first retrieved from www.nbc11.com on Jul. 16, 2008.
(Continued)

*Primary Examiner* — Erika A Washington
(74) *Attorney, Agent, or Firm* — Jon Gibbons; Fleit Gibbons Gutman Bongini & Bianco P.L.

(57) ABSTRACT

A system and method for providing traffic notifications to mobile devices is provided. The system obtains device data from a plurality of mobile devices within a similar area, gathered using, e.g., a GPS system. According to the speed that the mobile devices are travelling and the location of the similar area, traffic events can be identified and other mobile devices notified to provide dynamic updates as traffic situations change. Follow up notifications can be provided to update the user regarding the progress of traffic congestion, detours can be suggested, and various alerts provided. The mobile device may be connected to or part of a vehicle and leverage the notification system to provide different types of alerts and to notify users using various mechanisms.

21 Claims, 16 Drawing Sheets

(51) Int. Cl.
  *H04W 4/04* (2009.01)
  *G08G 1/0967* (2006.01)
  *G08G 1/0969* (2006.01)
  *H04W 4/02* (2009.01)
  *H04L 29/08* (2006.01)
  *G08G 1/01* (2006.01)

(52) U.S. Cl.
  CPC .... *G08G1/096741* (2013.01); *G08G 1/096775* (2013.01); *H04L 67/18* (2013.01); *H04W 4/02* (2013.01)

(56) References Cited

U.S. PATENT DOCUMENTS

| | | | |
|---|---|---|---|
| 6,590,507 | B2 | 7/2003 | Burns |
| 6,810,321 | B1* | 10/2004 | Cook ............................ 701/117 |
| 7,493,208 | B1 | 2/2009 | Craine |
| 8,351,912 | B2 | 1/2013 | Wormald et al. |
| 2002/0068583 | A1* | 6/2002 | Murray ......................... 455/456 |
| 2004/0073356 | A1 | 4/2004 | Craine |
| 2005/0075782 | A1 | 4/2005 | Torgunrud |
| 2006/0258360 | A1 | 11/2006 | Smith |
| 2007/0010934 | A1 | 1/2007 | Breitenberger et al. |
| 2007/0010942 | A1* | 1/2007 | Bill .............................. 701/209 |
| 2007/0038360 | A1 | 2/2007 | Sakhpara |
| 2009/0265099 | A1* | 10/2009 | Gottlieb ....................... 701/208 |

FOREIGN PATENT DOCUMENTS

| | | |
|---|---|---|
| WO | WO 2007/049110 A1 | 5/2007 |
| WO | WO 2007/145565 A1 | 12/2007 |

OTHER PUBLICATIONS

"Your cell phone and traffic congestion"; article by Drivers.com staff; first retrieved from www.drivers.com/article/994/; Jul. 16, 2008.
www.airsage.com/answers.htm; first retrieved Jul. 16, 2008.
Wagner, U.; Search Report from corresponding European Application No. 08171506.2; search completed May 29, 2009.

* cited by examiner

SYSTEM AND METHOD FOR PROVIDING TRAFFIC NOTIFICATIONS TO MOBILE DEVICES

CROSS-REFERENCE TO RELATED APPLICATIONS

This application is a continuation of U.S. patent application Ser. No. 13/720,312 filed on Dec. 19, 2012 (now issued as U.S. Pat. No. 8,781,451), which is a continuation of U.S. patent application Ser. No. 12/333,495 filed on Dec. 12, 2008 (now issued as U.S. Pat. No. 8,351,912), both incorporated herein by reference.

TECHNICAL FIELD

The following relates generally to location based services (LBS) for mobile devices, and in particular to systems and methods for providing traffic notifications to mobile devices.

DESCRIPTION OF THE RELATED ART

Rush hour traffic volume, road construction, vehicular collisions, and roadside emergencies are just a few examples of the various events and circumstances that can cause traffic congestion. Due to the nature of such events traffic congestion can be difficult to predict. Although radio, television, and online news sources can provide traffic information gathered using various techniques such as highway cameras, phone-in traffic tips, satellite imagery, and road sensors; this information is not always current or entirely accurate.

Old or inaccurate traffic information can be troublesome for various reasons. For example, an alternate traffic route, which may be less convenient, is chosen due to a traffic report indicating that a traffic problem exists, which problem has since been alleviated. This can cause a commuter to take a less optimal route, which can waste fuel, cause them to be late, and cause congestion on side-roads. Conversely, a traffic report may indicate that the commuter's route is clear, when in fact an event has, in the meantime, created a traffic jam, since the traffic report is based on information that is not current.

BRIEF DESCRIPTION OF THE DRAWINGS

Embodiments will now be described by way of example only with reference to the appended drawings wherein.

DETAILED DESCRIPTION

Figure 1:
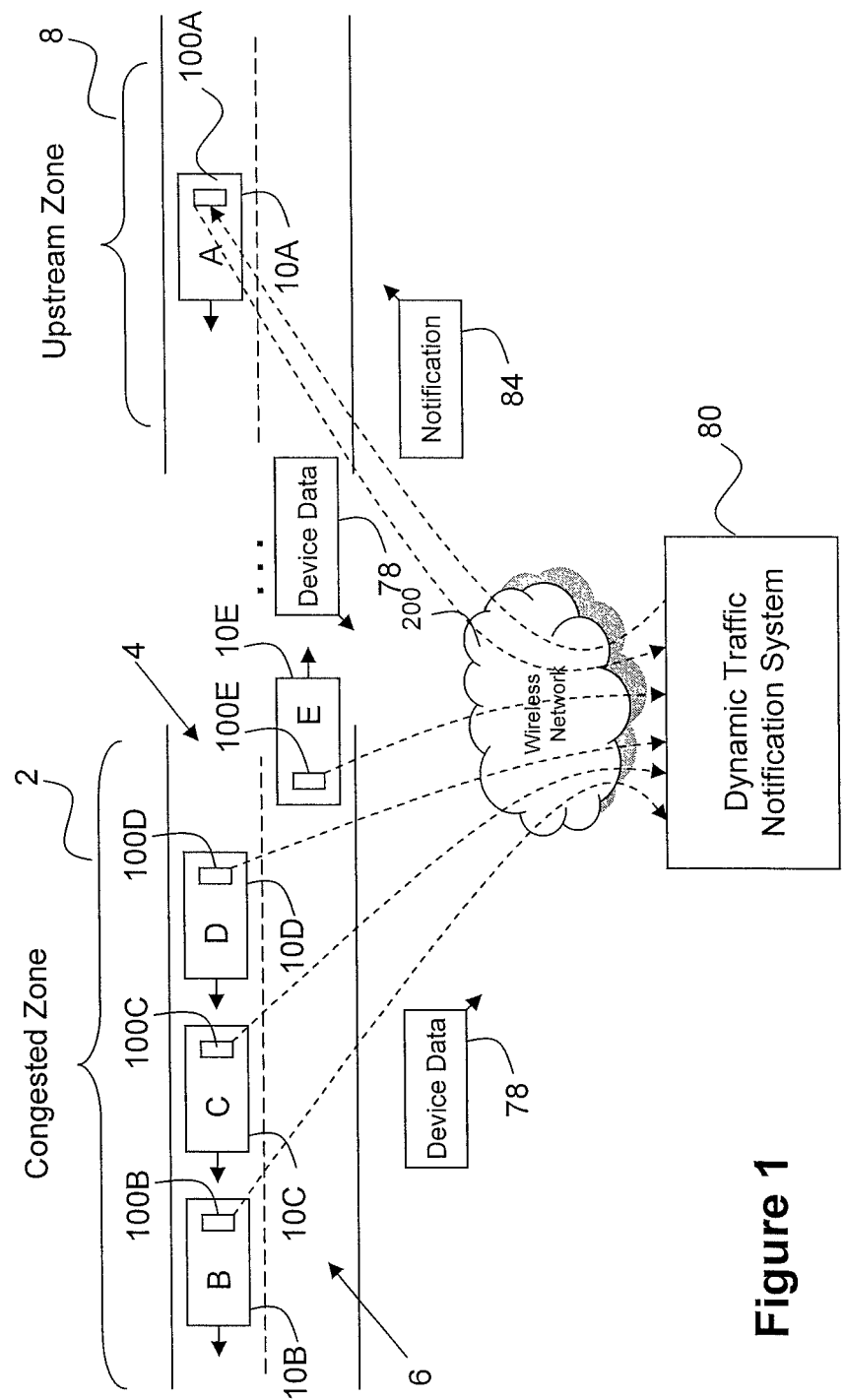
FIG. 1 is a schematic diagram illustrating an exemplary embodiment of a traffic notification system providing a traffic notification to one mobile device according to data obtained from a plurality of other mobile devices.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It has been recognized that data pertaining to the location and speed of a plurality of mobiles devices can be used to generate dynamic notifications for other mobile devices that may be affected by traffic issues ascertained from the data provided by the plurality of mobile devices.

Turning now to FIG. 1, an example zone of traffic is shown, which comprises a traffic "problem" hereinafter named a congested zone 2. The congested zone 2 comprises a "left-bound" lane of traffic 4 (i.e. with respect to the page) and a "right-bound" lane of traffic 6. It can be seen that the congested zone 2 represents a common zone of traffic congestion caused by any one or more traffic events. Another zone of traffic is also shown in FIG. 1 and, in this example, represents an upstream zone 8, which refers to any roadway that is: approaching, expected to connect, lead into, or is simply an upstream portion of a same roadway that includes the congested zone 2. In this example, the upstream zone 8 thus feeds traffic into the congested zone 2 such that at least one mobile device 100 approaching the congested zone 2 can be determined.

In the example shown in FIG. 1, the congested zone 2 at a particular point in time comprises three vehicles travelling left-bound 4, namely vehicles 10B, 10C, and 10D; and comprises a single vehicle 10E travelling right-bound 6. For the present discussion, the congestion occurs in the left-bound lane only whereas vehicle 10E is moving at a normal rate of speed in the right-bound lane. The upstream zone 8, at the same point in time, comprises a single vehicle 10A travelling left-bound 4 towards the congested zone 2. Each vehicle 10A-10E comprises a respective data communications device, hereinafter referred to as a mobile device 100A-100E, which travels with the corresponding vehicle 10A-10E in which it currently resides. As will be explained below, the mobile device 100 can be any suitable device capable of communicating via a wireless network 200. The mobile devices 100 utilize such capability to provide device data 78 to a dynamic traffic notification system 80, via the wireless network 200. The device data 78 comprises information related to the location and speed of the vehicle 10, as measured by, or obtained by (or from) another source, the mobile device 10 located and travelling within the vehicle 10. For example, mobile device 100B in vehicle 10B may utilize a GPS function to measure the speed of the vehicle 10B and the current location, prepare device data 78, and send the device data 78 to the dynamic traffic notification system 80, hereinafter referred to as "the notification system 80" for brevity.

As will also be explained below, the notification system 80 uses device data 78 from a plurality of mobile devices 100 to dynamically determine traffic conditions, such as the development of the congested zone 2, in order to prepare a notification 84 that can be sent to a mobile device 100 that is expected to be headed towards the congested zone 2.

To aid the reader in understanding at least one environment in which the notification system 80 may be implemented, an example system comprising the wireless network 200 and other components that may be used to effect communications between mobile devices 100 and the notification system 80 will now be described.

As noted above, data communication devices will be commonly referred to as "mobile devices". Examples of applicable mobile devices include pagers, cellular phones, cellular smart-phones, portable gaming and entertainment devices, wireless organizers, personal digital assistants, computers, laptops, handheld wireless communication devices, wirelessly enabled notebook computers and the like.

One exemplary mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

The mobile device may be one that is used in a system that is configured for continuously routing all forms of pushed information from a host system to the mobile device. One example of such a system will now be described.

Figure 2:
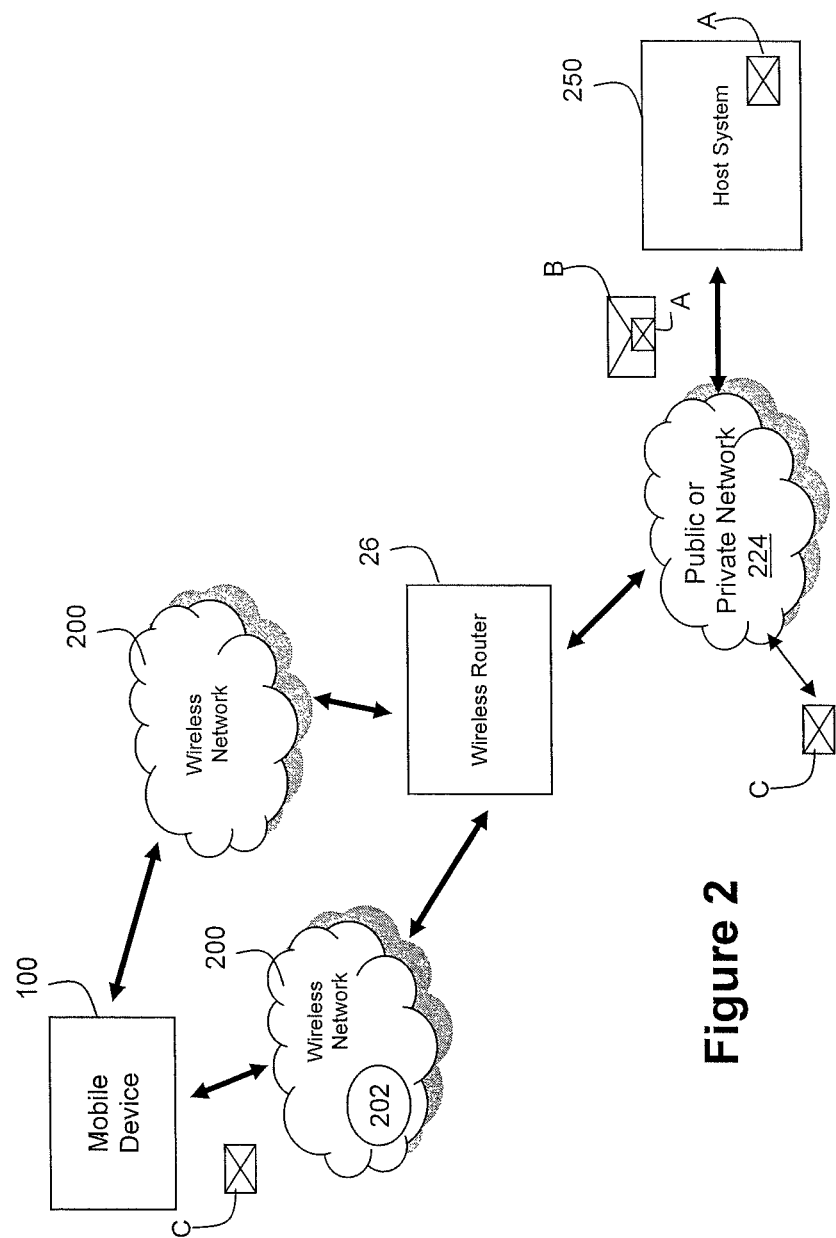
FIG. 2 is a system diagram illustrating the environment in which data items are pushed from a host system to a mobile device.

Referring now to FIG. 2, an example system diagram showing the redirection of user data items (such as message A or C) from a corporate enterprise computer system (host system) 250 to the user's mobile device 100 via a wireless router 26 is provided. The wireless router 26 provides the wireless connectivity functionality as it acts to both abstract most of the wireless network's 200 complexities, and it also implements features necessary to support communicating with and pushing data to the mobile device 100. Although not shown, a plurality of mobile devices may access data from the host system 250. In this example, message A in FIG. 2 represents an internal message sent from, e.g. a desktop computer within the host system 250, to any number of server computers in the corporate network 260 (e.g. LAN), which may, in general, include a database server, a calendar server, an E-mail server or a voice-mail server.

Message C in FIG. 2 represents an external message from a sender that is not directly connected to the host system 250, such as the user's mobile device 100, some other user's mobile device (not shown), or any user connected to the public or private network 224 (e.g. the Internet). Message C could be e-mail, voice-mail, calendar information, database updates, web-page updates or could even represent a command message from the user's mobile device 100 to the host system 250. The host system 250 may comprise, along with the typical communication links, hardware and software associated with a corporate enterprise computer network system, one or more wireless mobility agents, a TCP/IP connection, a collection of datastores, (for example a data store for e-mail could be an off-the-shelf mail server like Microsoft Exchange® Server or Lotus Notes® Server), all within and behind a corporate firewall.

The mobile device 100 may be adapted for communication within wireless network 200 via wireless links, as required by each wireless network 200 being used. As an illustrative example of the operation for a wireless router 26 shown in FIG. 2, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through a firewall protecting the wireless router 26.

Although the above describes the host system 250 as being used within a corporate enterprise network environment, this is just one embodiment of one type of host service that offers push-based messages for a handheld wireless device that is capable of notifying and preferably presenting the data to the user in real-time at the mobile device when data arrives at the host system.

By offering a wireless router 26 (sometimes referred to as a "relay"), there are a number of major advantages to both the host system 250 and the wireless network 200. The host system 250 in general runs a host service that is considered to be any computer program that is running on one or more computer systems. The host service is said to be running on a host system 250, and one host system 250 can support any number of host services. A host service may or may not be aware of the fact that information is being channelled to mobile devices 100. For example an e-mail or message program 138 (see FIG. 5) might be receiving and processing e-mail while an associated program (e.g. an e-mail wireless mobility agent) is also monitoring the mailbox for the user and forwarding or pushing the same e-mail to a wireless device 100. A host service might also be modified to prepare and exchange information with mobile devices 100 via the wireless router 26, like customer relationship management software. In a third example, there might be a common access to a range of host services. For example a mobility agent might offer a Wireless Access Protocol (WAP) connection to several databases.

As discussed above, a mobile device 100 may be a handheld two-way wireless paging computer as exemplified in FIGS. 3-8, a wirelessly enabled palm-top computer, a mobile telephone with data messaging capabilities, a PDA with mobile phone capabilities, a wirelessly enabled laptop computer, a vending machine with an associated OEM radio modem, a wirelessly-enabled heart-monitoring system or, alternatively, it could be other types of mobile data communication devices capable of sending and receiving messages via a network connection, e.g. a portable gaming device. Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 100 and wireless network 200, offer push services to standard web-based server systems and allow a host service in a host system 250 to reach the mobile device 100 in many countries.

The host system 250 shown herein has many methods when establishing a communication link to the wireless router 26. For one skilled in the art of data communications the host system 250 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/XML, HTTP/Proprietary, FTP, SMTP or some other proprietary data exchange protocol. The type of host systems 250 that might employ the wireless router 26 to perform push could include: field service applications, e-mail services, stock quote services, banking services, stock trading services, field sales applications, advertising messages and many others. This wireless network 200 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 250, or that the host system 250 acquires through the use of intelligent agents, such as data that is received after the host system 250 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 250, the wireless router 26 may implement a set of defined functions. It can be appreciated that one could select many different hardware configurations for the wireless router 26, however, many of the same or similar set of features would likely be present in the different configurations.

Figure 4:
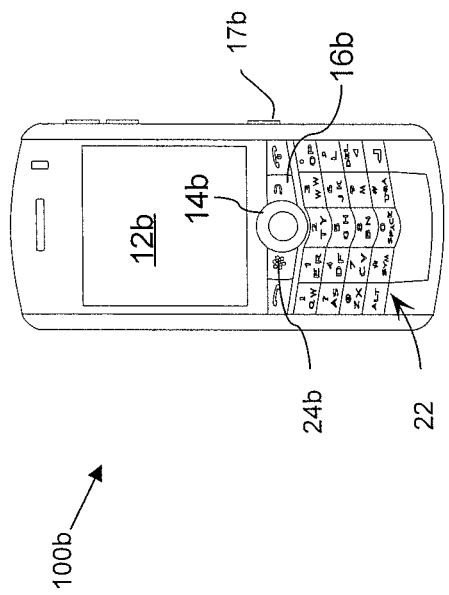
FIG. 4 is a schematic diagram of another mobile device and a display screen therefor.
Figure 3:
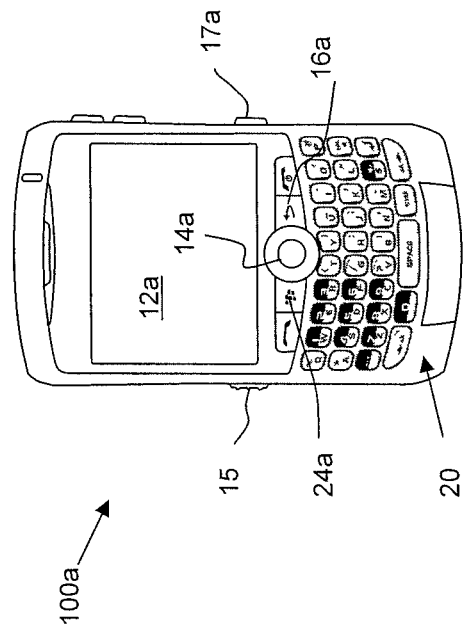
FIG. 3 is a schematic diagram of a mobile device and a display screen therefor.

Referring to FIGS. 3 and 4, one embodiment of a mobile device 100a is shown in FIG. 3, and another embodiment of a mobile device 100b is shown in FIG. 4. It will be appreciated that the numeral "100" will hereinafter refer to any mobile device 100, including the embodiments 100a and 100b, those embodiments enumerated above or otherwise. It will also be appreciated that a similar numbering convention may be used for other general features common between FIGS. 3 and 4 such as a display 12, a positioning device 14, a cancel or escape button 16, a camera button 17, and a menu or option button 24.

The mobile device 100a shown in FIG. 3 comprises a display 12a and the cursor or view positioning device 14 shown in this embodiment is a trackball 14a. Positioning device 14 may serve as another input member and is both rotational to provide selection inputs to the main processor 102 (see FIG. 5) and can also be pressed in a direction generally toward housing to provide another selection input to the processor 102. Trackball 14a permits multi-directional positioning of the selection cursor 18 (see FIG. 7) such that the selection cursor 18 can be moved in an upward direction, in a downward direction and, if desired and/or permitted, in any diagonal direction. The trackball 14a is in this example situated on the front face of a housing for mobile device 100a as shown in FIG. 3 to enable a user to manoeuvre the trackball 14a while holding the mobile device 100a in one hand. The trackball 14a may serve as another input member (in addition to a directional or positioning member) to provide selection inputs to the processor 102 and can preferably be pressed in a direction towards the housing of the mobile device 100b to provide such a selection input.

The display 12 may include a selection cursor 18 that depicts generally where the next input or selection will be received. The selection cursor 18 may comprise a box, alteration of an icon or any combination of features that enable the user to identify the currently chosen icon or item. The mobile device 100a in FIG. 3 also comprises a programmable convenience button 15 to activate a selected application such as, for example, a calendar or calculator. Further, mobile device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15 and camera button 17a are disposed at the side of the housing. This button placement enables a user to operate these buttons while holding the mobile device 100 in one hand. The keyboard 20 is, in this embodiment, a standard QWERTY keyboard.

The mobile device 100b shown in FIG. 4 comprises a display 12b and the positioning device 14 in this embodiment is a trackball 14b. The mobile device 100b also comprises a menu or option button 24b, a cancel or escape button 16b, and a camera button 17b. The mobile device 100b as illustrated in FIG. 4, comprises a reduced QWERTY keyboard 22. In this embodiment, the keyboard 22, positioning device 14b, escape button 16b and menu button 24b are disposed on a front face of a mobile device housing. The reduced QWERTY keyboard 22 comprises a plurality of multi-functional keys and corresponding indicia including keys associated with alphabetic characters corresponding to a QWERTY array of letters A to Z and an overlaid numeric phone key arrangement.

It will be appreciated that for the mobile device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other whether presently known or unknown may be employed. Similarly, any variation of keyboard 20, 22 may be used. It will also be appreciated that the mobile devices 100 shown in FIGS. 3 and 4 are for illustrative purposes only and various other mobile devices 100 are equally applicable to the following examples. For example, other mobile devices 100 may include the trackball 14b, escape button 16b and menu or option button 24 similar to that shown in FIG. 4 only with a full or standard keyboard of any type. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities. Furthermore, the housing for the mobile device 100 should not be limited to the single-piece configurations shown in FIGS. 3 and 4, other configurations such as clamshell or "flip-phone" configurations are also applicable.

Now, to aid the reader in understanding the structure of the mobile device 100 and how it communicates with the wireless network 200, reference will now be made to FIGS. 5 through 8.

Figure 5:
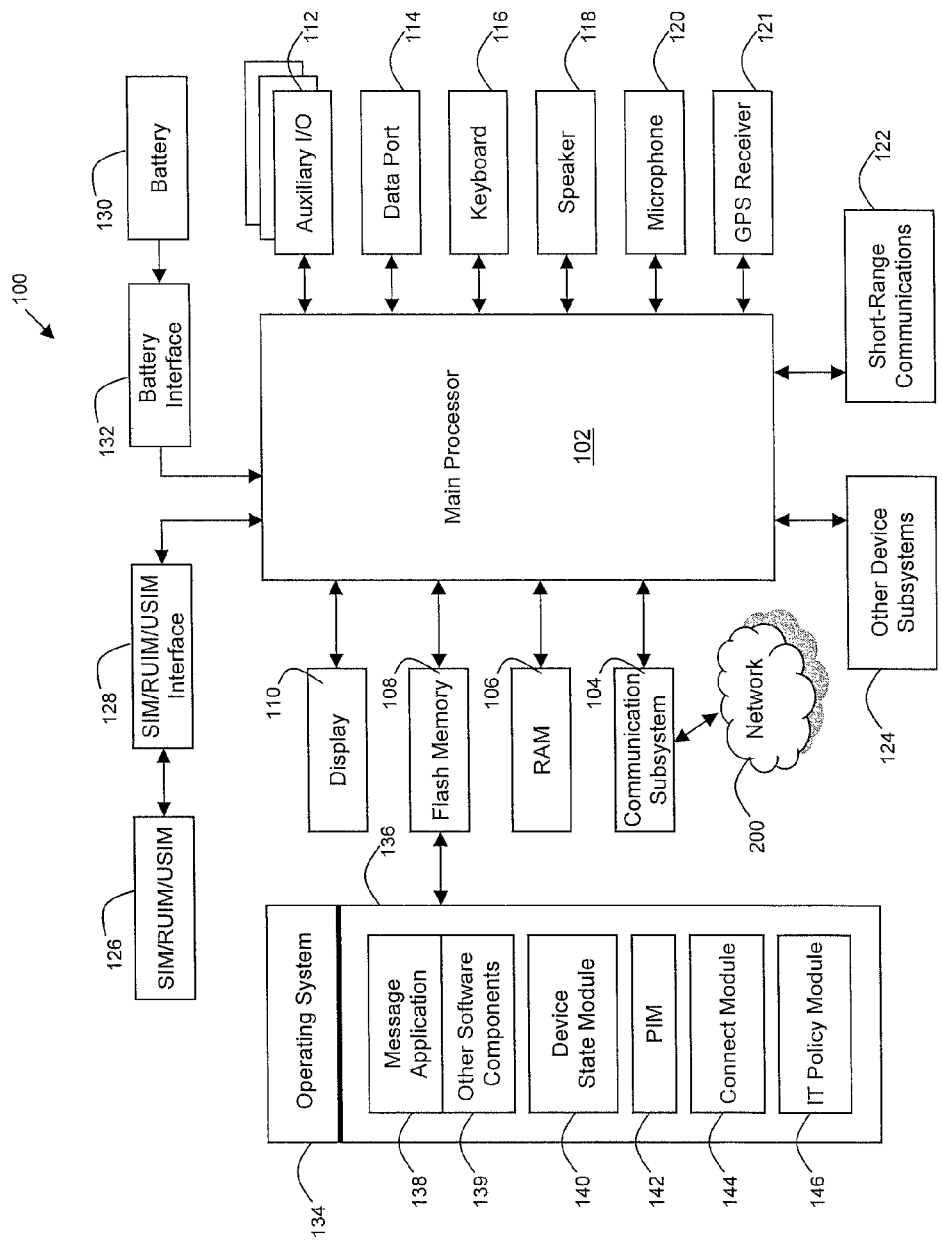
FIG. 5 is a block diagram of an exemplary embodiment of a mobile device.

Referring first to FIG. 5, shown therein is a block diagram of an exemplary embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, text messages, instant messages, contacts, calendar events, and voice mails, and may interact with the wireless network 200. A connect module 144 implements the communication protocols that are required for the mobile device 100 to communicate with the wireless infrastructure and any host system 250, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

Figure 6:
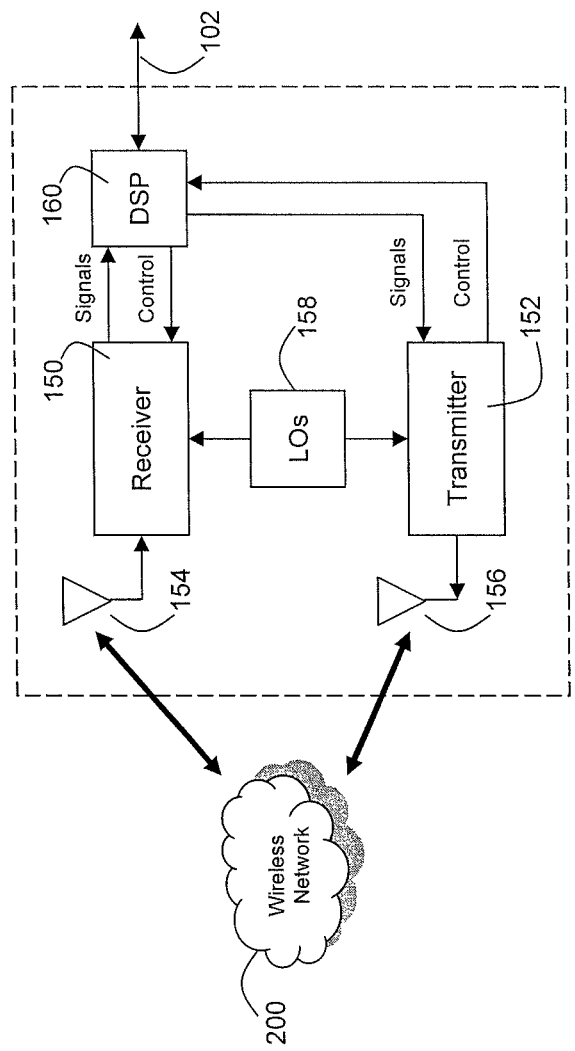
FIG. 6 is a block diagram of an exemplary embodiment of a communication subsystem component of the mobile device of FIG. 5.

Referring now to FIG. 6, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 6 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 may be periodically turned off to conserve power until it is needed to receive signals or information (if at all) during designated time periods.

Figure 7:
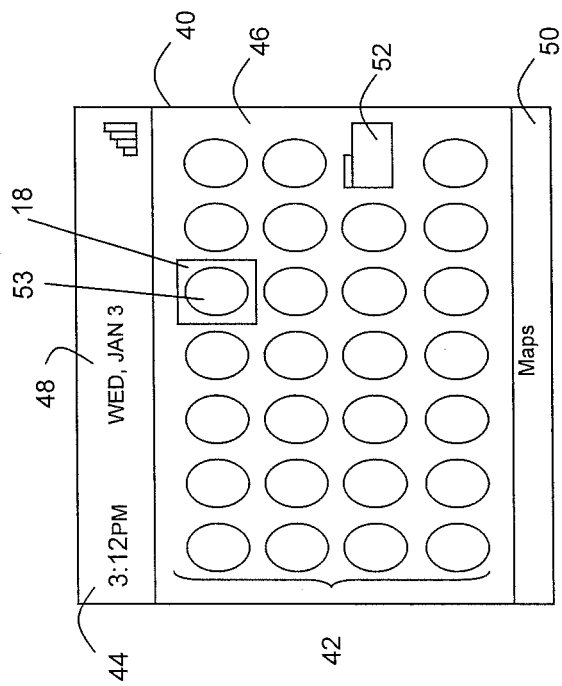
FIG. 7 is a screen shot of an exemplary home screen displayed by a mobile device.

Turning now to FIG. 7, the mobile device 100 may display a home screen 40, which may be the active screen when the mobile device 100 is powered up or may be accessible from other screens. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 7 provides a grid of icons. It will be appreciated that preferably several themes are available for the user to select and that any applicable arrangement may be used. One or more of the series of icons 42 is typically a folder 52 that itself is capable of organizing any number of applications therewithin.

The status region 44 in this embodiment comprises a date/time display 48. The theme background 46, in addition to a graphical background and the series of icons 42, also comprises a status bar 50. The status bar 50 provides information to the user based on the location of the selection cursor 18, e.g. by displaying a name for the icon 53 that is currently highlighted.

An application, such as a maps program 60 (see also FIG. 8) may be initiated (opened or viewed) from display 12 by highlighting a corresponding icon 53 using the positioning device 14 and providing a suitable user input to the mobile device 100. For example, maps program 60 may be initiated by moving the positioning device 14 such that the icon 53 is highlighted by the selection box 18 as shown in FIG. 7, and providing a selection input, e.g. by pressing the trackball 14b.

Figure 8:
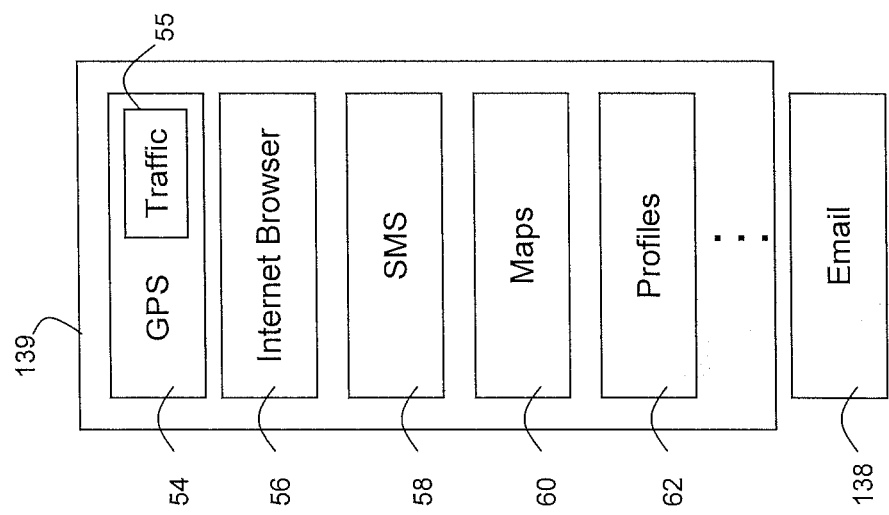
FIG. 8 is a block diagram illustrating exemplary ones of the other software applications and components shown in FIG. 5.

FIG. 8 shows an example of the other software applications and components 139 that may be stored on and used with the mobile device 100. Only examples are shown in FIG. 8 and such examples are not to be considered exhaustive. In this example, a global positioning system (GPS) application 54, internet browser 56, simple message service (SMS) 58, maps program 60 and a profiles application 62 are shown to illustrate the various features that may be provided by the mobile device 100. The GPS application 54, in this example, comprises a traffic module 55, which represents any sub-program, sub-routine, function or other set of computer executable instructions for providing device data 78 to the notification system 80, when such data 78 is obtained using the GPS application 54. Also shown in FIG. 8 is the message application 138, which in the following will be referred to as an email application 138 for clarity. It will be appreciated that the various applications may operate independently or may utilize features of other applications. For example, the GPS application 54 may use the maps program 60 for displaying directions to a user.

Figure 9:
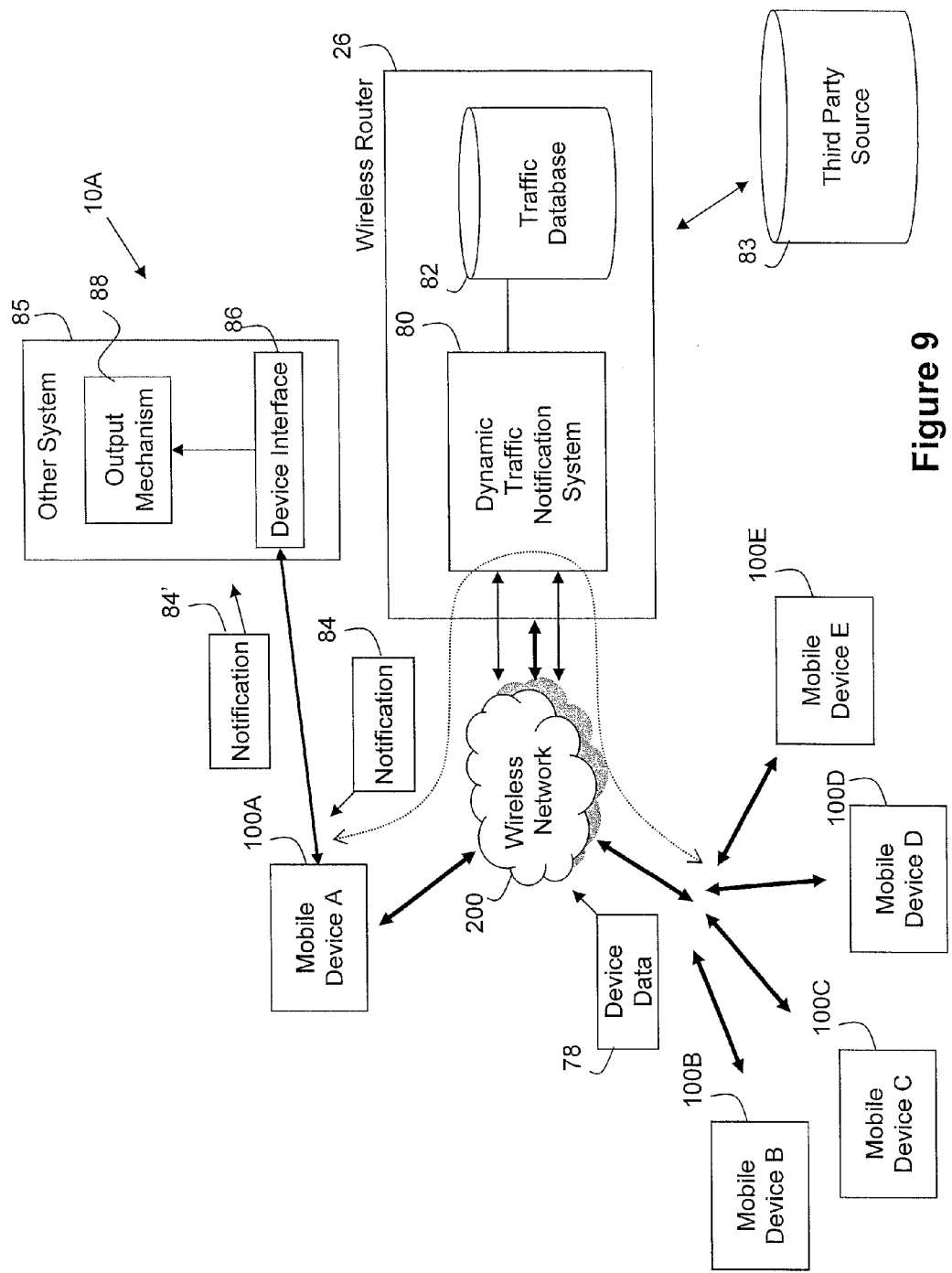
FIG. 9 is a schematic diagram showing an example configuration for the embodiment of FIG. 1 when implemented with the wireless router shown in FIG. 2.

Turning now to FIG. 9, an exemplary implementation of the notification system 80 is shown, wherein the notification system 80 is hosted by the wireless router 26 described above. In this example, the wireless router 26 is responsible for routing messages from and to mobile devices 100A-100E and thus has the ability to obtain device data 78 provided by a plurality of such mobile devices 100 in order to prepare notifications 84 for those plurality of mobile devices 100 and other mobile devices. Consistent with FIG. 1, the implementation exemplified in FIG. 9 illustrates obtaining device data 78 from each of mobile devices 100B through 100E and provides a notification 84 to mobile device 100A. It will be appreciated that the device data 78 and notifications 84 may comprise separate and distinct data packages sent using separate protocols or may take advantage of existing communication methods such as email, SMS, etc.

The notification system 80, which in this example resides at the wireless router 26, stores traffic-related data in a traffic database 82. Such traffic-related data may comprise any device data 78 obtained from various mobile devices 100, copies of notifications 84 that have already been sent (or are about to be sent—to facilitate repeated use of the same notifications 84), and any other information that may be required to carry out the delivery of a notification 84 based on the acquisition of device data 78, several examples of which will be explained below. It will be appreciated that the traffic database 82 may represent any memory, data store, or storage medium, and may or may not be internal to the wireless router 26. For example, the traffic database 82 may be maintained by a third party or configured to be an integral component of the notification system 80. As such, the configuration shown in FIG. 9 is merely for illustrative purposes and variations thereof are equally applicable according to the principles described herein. The notification system 80 may also have access to a third party source 83 to obtain additional data pertaining to traffic events and other location based information. For example, the third party source 83 may represent police or emergency crew dispatchers that provide more detailed information pertaining to traffic accidents. The third party source 83 may also provide information such as the locations of gas stations, tow trucks, etc. for use in various embodiments as will be exemplified below. There may be any number of third party sources 83 available to the notification system 80 according to the particular embodiment.

FIG. 9 also illustrates an example configuration at the location of the mobile device 100A. In addition to providing an alert to the user of the mobile device 100A using the notification 84 on the mobile device 100A itself, FIG. 9 illustrates that the notification may be used in other ways. In this example, a copy of the notification 84' is provided to an other system 85 through a device interface 86 such that an alert may be provided to the user through an output mechanism 88. For example, the vehicle 10A is shown as comprising the other system 85, which may represent a vehicle entertainment or navigation system, a vehicle engine control system, as well as various dashboard implemented systems. In this way, the mobile device's access to the information comprised in the notification 84 can be shared with other systems in the same locale as the mobile device 100A in order to provide a wide range of alert types and to coordinate with other sub-systems.

The configuration shown in FIG. 9 can also enable a mobile device 100 without a GPS receiver 121 to utilize location and speed information acquired by the vehicle 10, for example through a vehicle navigation system, an on-board-diagnostics (OBD) connection or both. As such, the mobile device 100 can also be the communication link between a vehicle 10 and the notification system 80 to accommodate a wider range of environments and configurations. Also, the mobile device 100 may itself be integral to the vehicle 10 (not shown), e.g. where the vehicle has a GPS receiver and wireless connectivity. It can therefore be appreciated that the principles described herein may be applied to a mobile device 100 in any form, including embodiments wherein the mobile device 100 is a sub-system of a vehicle 10.

Figure 10:
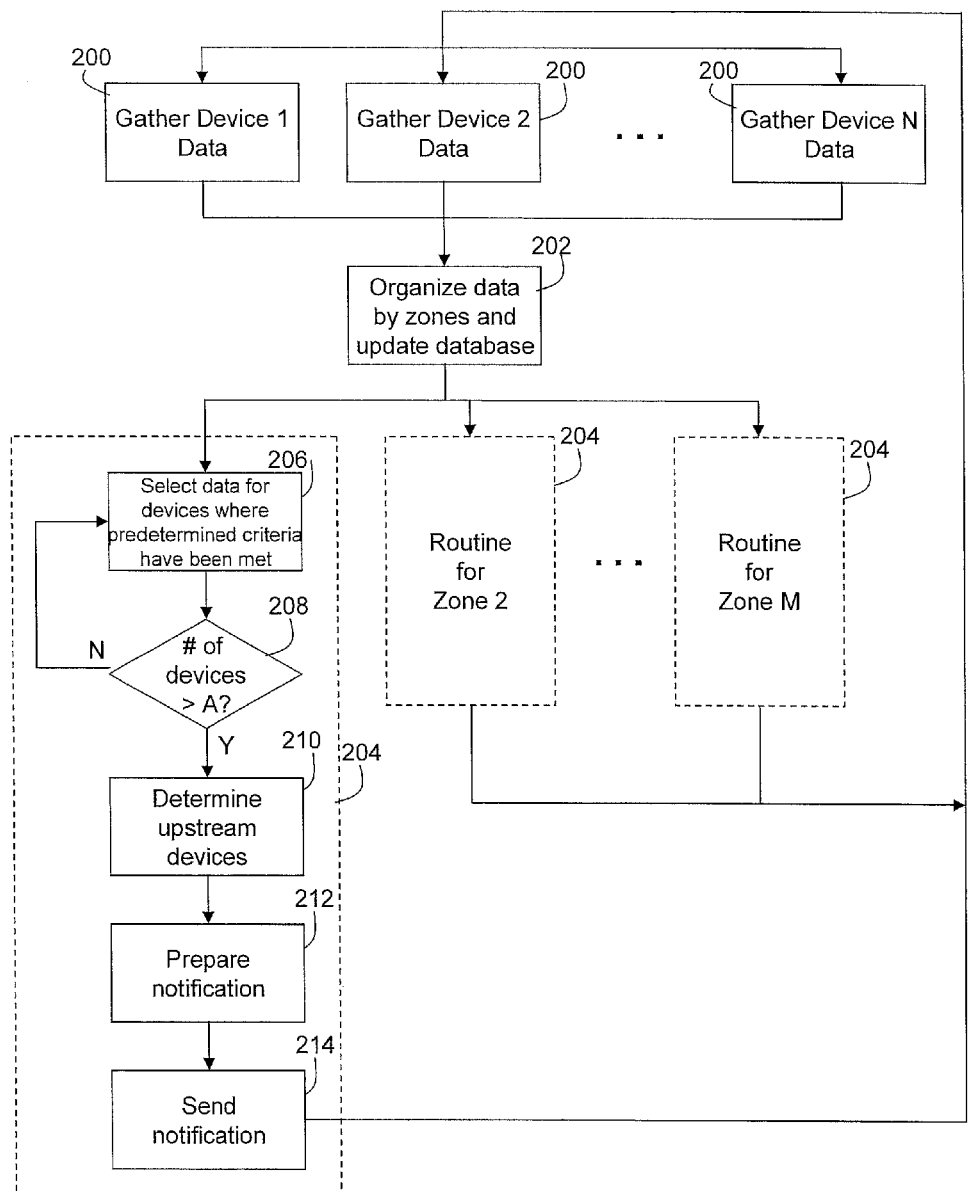
FIG. 10 is a flow diagram illustrating exemplary operations performed by a traffic notification system for preparing and providing a traffic notification to a mobile device.

Turning now to FIG. 10, one example illustrating the preparation of a notification 84 using device data 78 from a plurality of mobile devices 100 is shown. Device data 78 from N mobile devices 100, e.g. devices 1, 2, . . . , N, is obtained by the notification system 80 at 200, which data 78 is then stored in the traffic database 82. In the example shown in FIGS. 1 and 9, device data 78 is obtained from mobile devices 100A, 100B, 100C, 100D, and 100E. At 202, the device data 78 is then organized based on the zone from which it originates and the traffic database is updated. For example, the device data 78 from mobile devices 100B-100E would be grouped into one zone, whereas the device data 78 from mobile device 100A would be grouped into another zone.

The device data 78 may be stored according to the corresponding mobile device 100 or may instead be stored according to the current zone. In either case, the device data 78 should be time stamped such that a mobile device's movements can be tracked between snapshots of data and such that previous notifications and progress of that mobile device 100 is known. Also, movements of mobile devices 100 from one zone to another should be tracked. In this way, as the mobile device 100 moves progressively closer to a congested zone 2, the notifications may be modified to more intelligently redirect the mobile device 100. For example, a mobile device 100 that is 20 km away from the congested zone 2 may receive a different, less urgent warning, than a mobile device 100 that is 5 km away from the congested zone 2 or may be given a different suggestion for an alternative route. The combination of location and speed information, tracked over time can thus allow the notification system 80 to provide a cascade of notifications 84 according to the mobile device's location with respect to the congested zone 2.

The device data 78, thus grouped can then be used to perform a notification preparation routine at 204, for each zone at an applicable time. At 206, the routine 204 determines the speed at which each mobile device 100 and, according to predetermined (or user defined) criteria, whether or not such speed is "normal" (as opposed to an anomaly representing traffic congestion) given the location, time of day, etc. A criterion such as "Is speed<X km/h" can be used to determine the presence of traffic congestion whereby the device data 78 for vehicles 10 having a vehicle speed less than the threshold X are selected and can be used in determining traffic congestion. For example, in FIG. 1, vehicles 10B, 10C, and 10D are, in the snapshot shown, travelling at a relatively low rate of speed whereas vehicle 10E is travelling at a relatively higher or "normal" rate of speed. In this example, the device data 78 for vehicles 10B, 10C, and 10D would be chosen in step 206 whereas the device data 78 for vehicle 10E would be ignored. Other criteria such as empirically derived information can be used to determine what constitutes "normal" traffic. For example, rush hour traffic on certain routes may experience different traffic flow than the same route at other times during the day.

At 208, the notification system 80 may then determine if a predetermined number of mobile devices 100 have met the criteria applied during step 206 (e.g. according to threshold A shown in FIG. 10). In other words, the notification system 80 can use a plurality of measurements to confirm that traffic congestion is present, to avoid false positives, e.g. where one vehicle is pulling over, exiting a highway or turning. By having access to vehicle data 78 for multiple mobile devices 100, the notification system 80 can better distinguish traffic congestion from anomalies and prepare dynamic notifications 84 accordingly.

In one embodiment, the speed measurements that meet the criteria in step 206 are then be tallied at 208 and compared to threshold A, which may be for example A=2. In such an example, if 3 or more mobile devices 100 are travelling below a predetermined speed threshold, then a congested zone 2 is identified—e.g. as shown in FIG. 1. The notification 84 may then be sent to any number or all connected mobile devices 100 or, as shown in FIG. 10, the notification system 80 may also determine a set of one or more upstream mobile devices 100 that are headed to or are within a predetermined vicinity of the congested zone 2 at 210. In the present example, upon detecting that mobile devices 100B, 100C, and 100D form a congested zone 2, and determining that mobile device 100A is presently in, or headed towards, an upstream zone 8, the notification system 80 may then identify mobile device 100A as a candidate for receiving a notification 84.

The notification 84 may then be prepared at 212 and sent to the candidate mobile devices 100 at 214. The preparation of the notification 84 at 212 may include sub-steps (not shown) of determining, based on information in the traffic database 82, forms of communication for the notification 84, and may similarly determine appropriate content for a particular type of alert. For example, mobile device 100A may have selected an available option to receive an auditory alert rather than a visual alert and thus the notification 84 would be prepared accordingly.

The routine 204 shown in FIG. 10 may be executed continuously, semi-continuously, periodically or according to external events such as the receipt of a certain number of device data 78. Also, at 208, if it is determined that there are not enough speed measurements to identify a congested zone 2, the traffic database 82 may be periodically referenced such that as new device data 78 is received, the notification system 80 can dynamically react to changing environments. For example, a first wireless-enabled mobile device 100 may enter a traffic jam, which would not trigger the detection of a congested zone but as additional mobile devices 100 enter that zone, the traffic jam would then trigger. By continually or periodically referencing the incoming device data 78 the traffic jam can be more quickly detected. This also enables the notification system 80 to avoid triggering a notification 84 if, for example, the traffic congestion eases a few seconds later and no further mobile devices 100 are affected. FIG. 10 also illustrates that the notification system 80 can be adapted to cover multiple zones and can use any appropriate logic to determine which mobile devices 100 (if any) should receive a notification 84. For example, mobile device 100C, which is currently in congested zone 2, provides device data 78 that enables an alert to be provided to the user of mobile device 100A but may also receive another notification 84 (not shown) that alerts the user of mobile device 100C of traffic congestion further down stream, which is determined using device data 78 from other mobile devices. In this way, the device data 78 is effectively shared amongst all connected mobile devices 100 via the wireless network 200, wireless router 26, and notification system 80, the notification system 80 capable of first organizing and interpreting the device data 78 to provide dynamic and meaningful alerts for each mobile device user. As such, the mobile devices 100 can be used to both give and get information related to traffic congestion.

Figure 19:
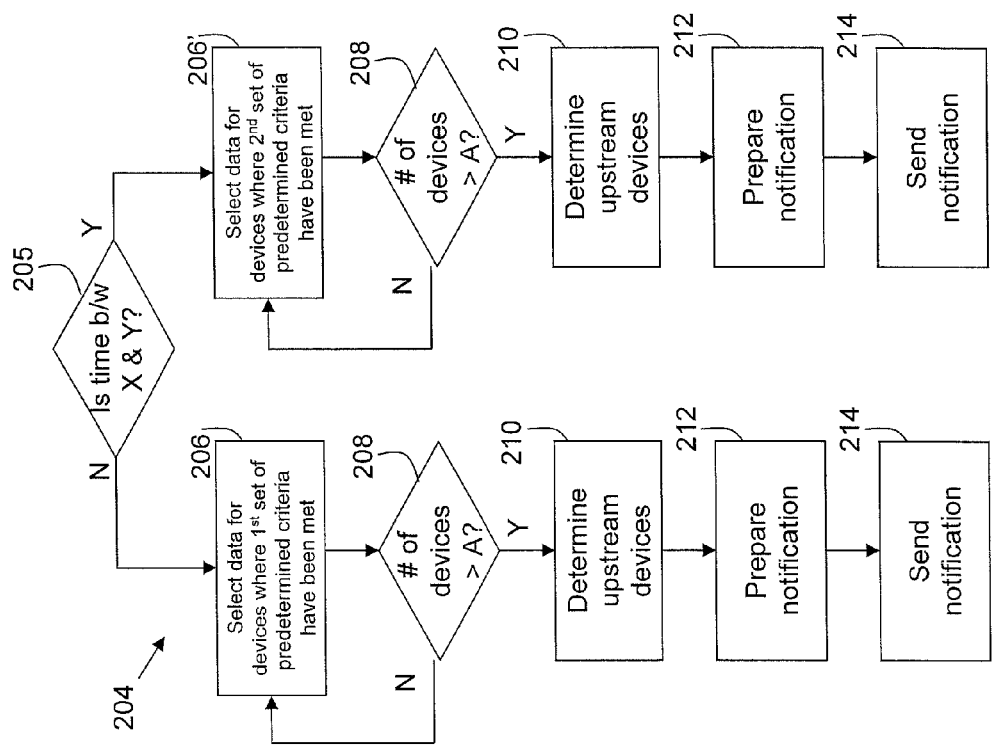
FIG. 19 is a flow diagram illustrating an alternative notification preparation routine to that exemplified in FIG. 10.

The notification system 80 may also execute different routines 204 for different zones, for example, to account for different circumstances. For example, certain roadways may be known to have significant slow-downs during rush hour and thus different thresholds may apply at different times of the day. In this example, detected speeds of, e.g. 40 kph, in a 100 kph zone may not be considered congestion but normal volume. Turning to FIG. 19, an example of a variation of the routine 204 is shown. In this variation, the notification system 80, for the particular zone, would first, at 205, determine the time at which the device data 78 was collected. In this example, if the relevant time is between X and Y, a first set of criteria is used at 206' to select mobile devices that are considered to not be "normal" (e.g. moving slower than expected). On the other hand, outside of this range, a second set of criteria is used, which can be the usual criteria shown in FIG. 10 or some other set of criteria. This allows the notification system 80 to lower the threshold during specific times during the day to take into account known or empirically derived information. For example: "Highway 6 is typically slow from 7 am to 9 am".

Figures 11, 12:
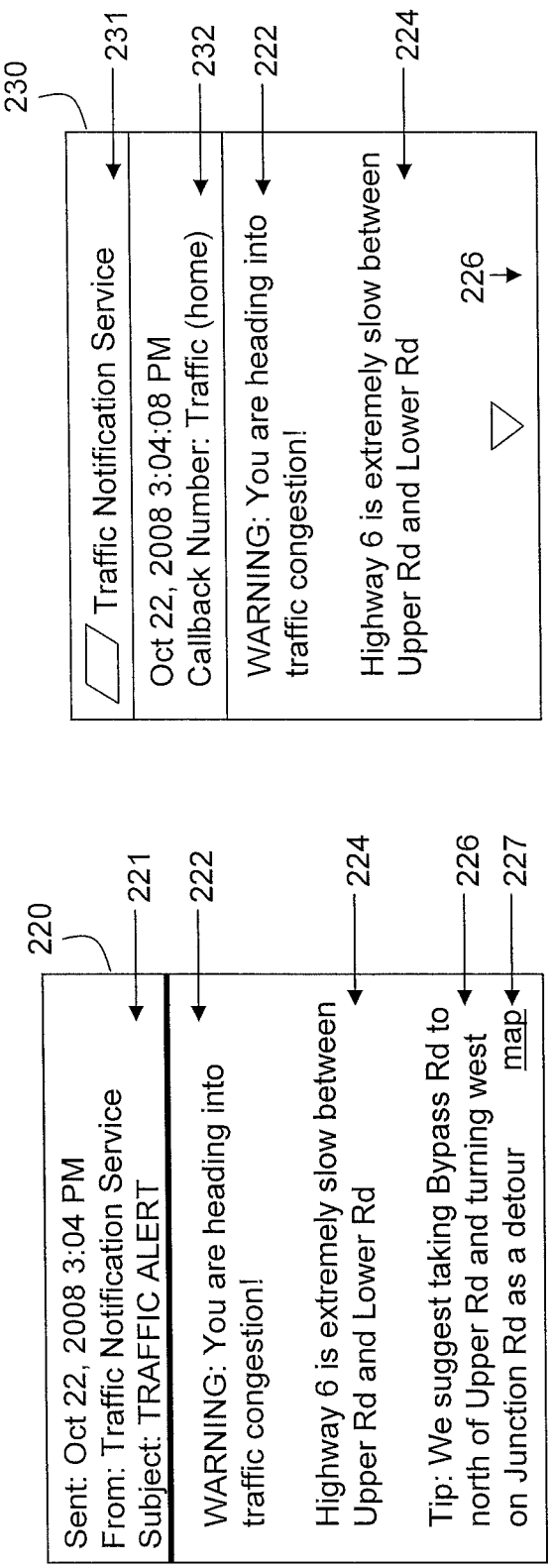
FIG. 11 is a screen shot illustrating a user interface (UI) for providing an email alert according to a received notification in one embodiment.
FIG. 12 is a screen shot illustrating a UI for providing a simple message service (SMS) alert according to a received notification in one embodiment.

As discussed above, the notification 84 may take various forms and may be delivered to each mobile device 100 via various media. FIG. 11 illustrates an exemplary email alert 220. In the example shown in FIG. 11, the email alert 220 is a regular email message that is received and handled by the mobile device 100 in the usual manner. The email alert 220 comprises a subject line 221 identifying the message as relating to a traffic alert, and the body of the alert 220, in this example, it comprises: a concise warning 222 introducing the nature of the alert, followed by further details 224 regarding the traffic congestion, followed by a tip 226 for bypassing the traffic congestion. It can be appreciated that the inclusion and nature of each portion (222, 224, 226) of the body of the email alert 220 is optional and if included, each portion may be presented in any desired order, e.g. according to user preferences. For example, user options can be provided to specify how the alert should be structured and what it should include. Similarly, to minimize the amount of reading involved, an amalgamated message (not shown) can be prepared which concisely provides a warning, location of congestion, and a detour. For example: "You are headed into traffic along Highway 6, use Detour Rd. as an alternate".

In the embodiment shown in FIG. 11, the concise warning 222 can be included to allow a "first glance" determination that the vehicle 10 is heading into traffic congestion. At an appropriate time, the email alert 220 can be accessed, opened, and viewed, using the email application 138, and the further details reviewed. The further details 224 can provide any level of detail desired and, in an email message, it is appreciated that this level of detail can be readily accommodated. In the example shown, the congested zone 2 is identified according to various landmarks such as being between certain roads and whether or not the traffic congestion is serious: "Highway 6 is extremely slow between Upper Rd and Lower Rd". The tip 226 can suggest an alternate route to avoid the congested zone 2. In this example, the following tip 226 is displayed: "We suggest taking Bypass Rd to north of Upper Rd and turning west on Junction Rd as a detour". In this way, if the opportunity arises, the user can utilize the mobile device 100 not only to be alerted to the traffic congestion, but also be provided with useful information to avoid the congested zone 2.

The email alert 220 may also comprise a link 227 to the map program 60 as shown in FIG. 11. This enables the user to conveniently access a visual representation of the detour suggested in the tip 226 or at least to view the area of congested zone 2 for perusal and further consideration.

FIG. 12 illustrates an example of an alternative form for the alert, namely an SMS alert 230. The SMS alert 230 can include some or all of the information carried by the email alert 220. The SMS alert 230 comprises a sender tag 231, which identifies the sender of the SMS alert 230 as being the Traffic Notification Service, which may be an SMS client created for the notification system 80 and used to forward SMS alerts 230 to various mobile devices 100. The SMS alert 230 also comprises sender and message details 232, and may include one or more of the portions 222, 224, 226 shown in FIG. 11. In this example, the concise warning 222 and further details 224 are visible in and the tip 226 can be viewed by navigating through the message. It will be appreciated that a portion of the SMS alert 230 can be sent and other portion(s) held back until requested, e.g. when the details of the alert are lengthy or exceed the limit of a single message. Alternatively, a first SMS alert 230 can be sent with a concise warning 222 and a link or call-back mechanism (not shown) provided to enable the user to request further details such as the tip 226 regarding a potential detour. Therefore, the SMS alert 230 can be adapted to be used in different environments with different constraints.

Figure 13:
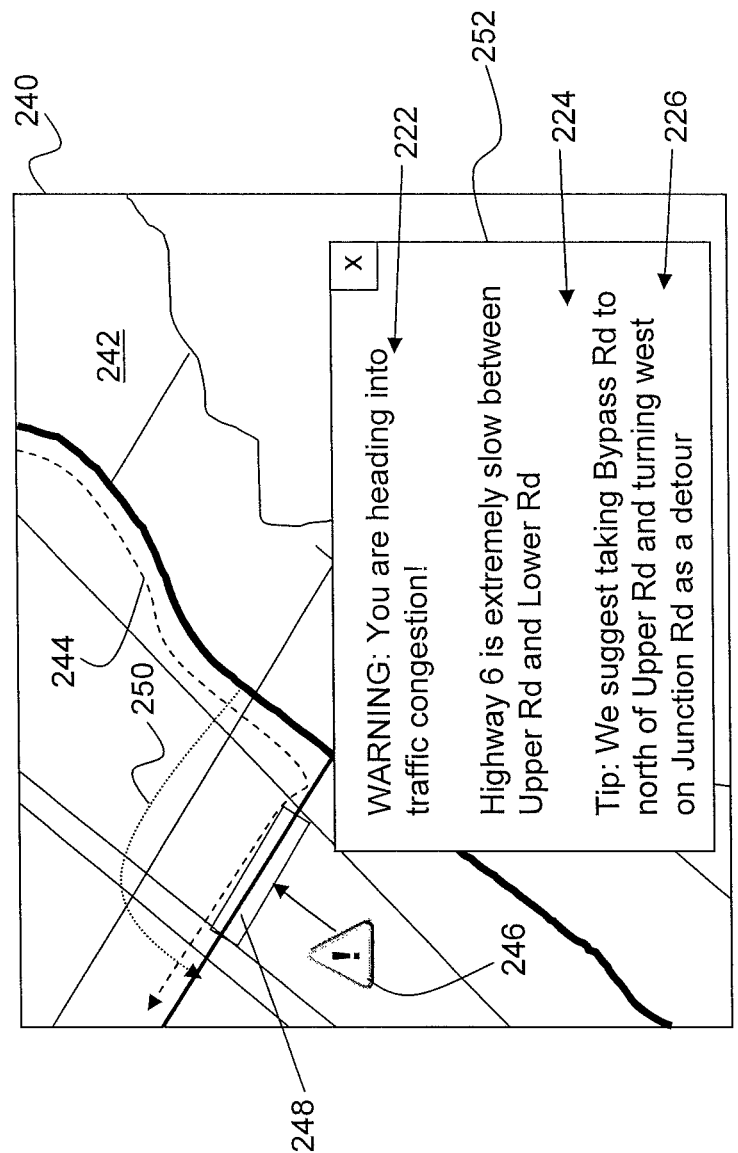
FIG. 13 is a screen shot illustrating a UI for providing an interactive map alert according to a received notification in one embodiment.

FIG. 13 illustrates another example of an alternative form for the traffic alert provided by the notification 84, in this example a map alert 240. As shown in FIG. 13, a map 242 of an area that comprises the congested zone 248 can be displayed using the map program 60 with a warning graphic or icon 246 used to highlight the congested area. The map 242 may also provide an intended route 244 and an alternative route 250 to illustrate the detour suggested in the tip 226. The map alert 240 may also include a pop-up window 252 that includes the portions 222, 224, and 226 already exemplified. Although the pop-up window 252 is shown as an inset to the map 242, it will be appreciated that it could also be given a dedicated portion of the display 12, or can be accessible by highlighting a link (not shown), accessing a menu (not shown) or can be omitted by way of selecting appropriate user options. FIG. 13 thus illustrates an alternative that provides a visual representation of the alert using the information provided in the notification 84.

Various other alert types are possible and can be adapted to application-specific requirements, user preferences, or both. For example, the notification 84 may provide an overriding pop-up that is displayed over/within any current screen. The pop-up could be given a link 227 to the map program to enable both a quick warning and the possibility to access further and more detailed information. In yet another embodiment, the alert may comprise a phone call dialled from the notification system 80 to the mobile device 10 with an auditory warning spoken to the user. Similarly, the notification 84 may comprise a recorded auditory warning that is played to the user upon receipt. It can therefore be appreciated that the notification 84 and enclosed warning and information can be sent, processed, and displayed in any suitable manner according to the environment, output mechanisms available, and user preferences.

Figures 17A, 17B:
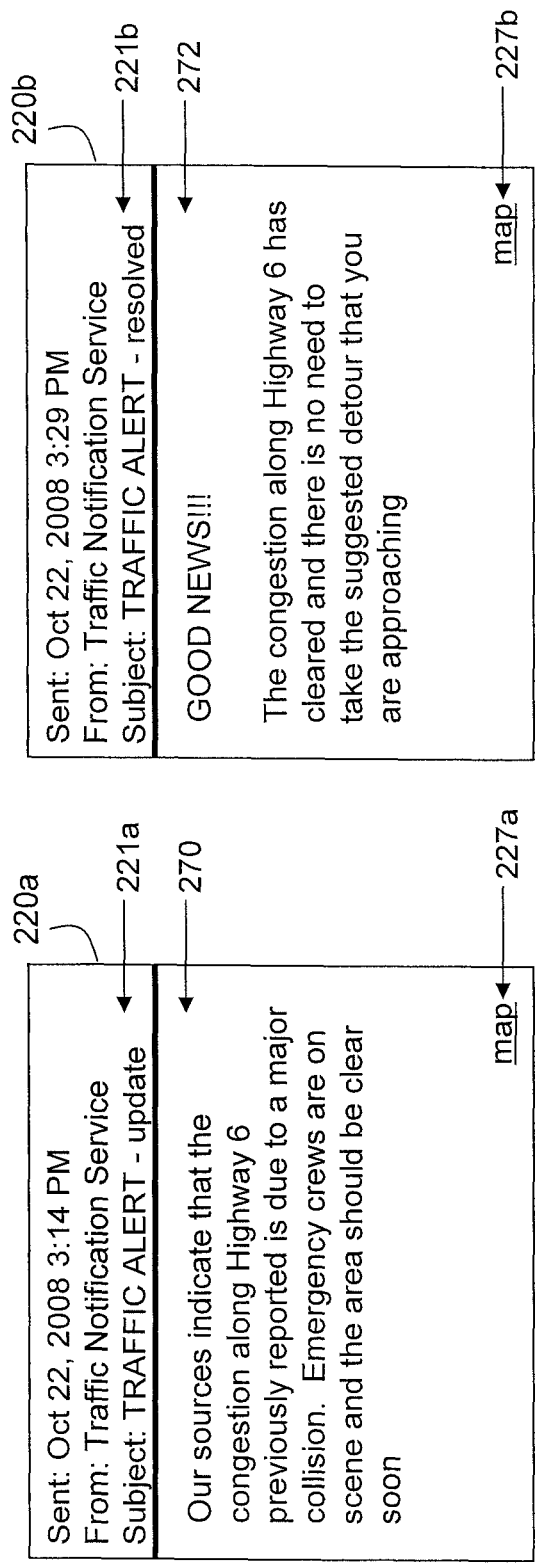
FIG. 17a is a screen shot illustrating an exemplary follow-up email notification to the email notification shown in FIG. 11.
FIG. 17b is a screen shot illustrating an exemplary further follow-up email notification to the email notifications shown in FIGS. 11 and 17a indicating that the traffic congestion has been resolved.

As discussed above, by tracking a mobile device's location over time, a cascade of notifications 84 can be sent, e.g. to further update the user regarding the progress of the traffic congestion or upon receiving additional information from a third party source 83. FIG. 17a shows a follow up alert 220a to the email alert 220 shown in FIG. 11. In the follow up alert 220a, an updated subject 221a can be provided to specify that the alert is an update and may provide more specific details to assist the user in recognizing the alert. An updated message 270 is included in the follow up alert 220a that in this example provides further detail obtained from a third party source 83 which explains the nature of the congestion and if available, the status. An updated map link 227a can also be provided to allow the user to initiate and load the maps program 60. In can be appreciated that according to the nature of the updated message 270, the extent of the congested zone 2 and the detours 250 may change and providing the updated map link 227a enables the user to confirm any changes. The follow up notification 200a is particularly useful when the mobile device 100 is still approaching but has not yet reached the congested zone 2. This allows more detail to be provided where possible.

FIG. 17b illustrates a further follow up alert 220b, which indicates in a further updated subject line 221b that the traffic congestion has been resolved. For example, if the mobile device 100 is still approaching the congested zone 2 as it is clearing, the notification system 80 can provide immediate and timely feedback to enable that mobile device 100 to avoid taking a detour. A detailed message 272 is provided that explains the updated situation and, in some embodiments, can further tailor the message 272 according to the previous alerts 220, 220a. For example, as shown in FIG. 17b, the message 272 indicates that the detour previously suggested does not need to be taken. Therefore, the device data 78 available to the notification system 80 enables intelligent notifications 84 to be prepared using such available information. An updated map link 227b can also be provided as before to resolve the user's route to remove reference to the detour, etc.

To accommodate various alternative alerts as exemplified herein, the notification 84 can be configured to carry various forms and amounts of data. For example, a generic notification 84 comprising the portions 222, 224, 226, delivered in an email alert 220 can also append or include a map alert 240 (or instructions for creating a map alert 240) to enable dual alerts or the choice between different alerts. The notification 84 may also provide an instruction to stimulate an auditory alert such as a particular tone, ring-tone, or speech alert. As such, the notification 84 can take any form, using any data structure, sent over any medium that is applicable to a particular mobile device 100 or a particular application of the notification system 80. For example, if employed with a network of video game devices, different alert types may be required than if employed with a network of mobile phones.

Figure 14:
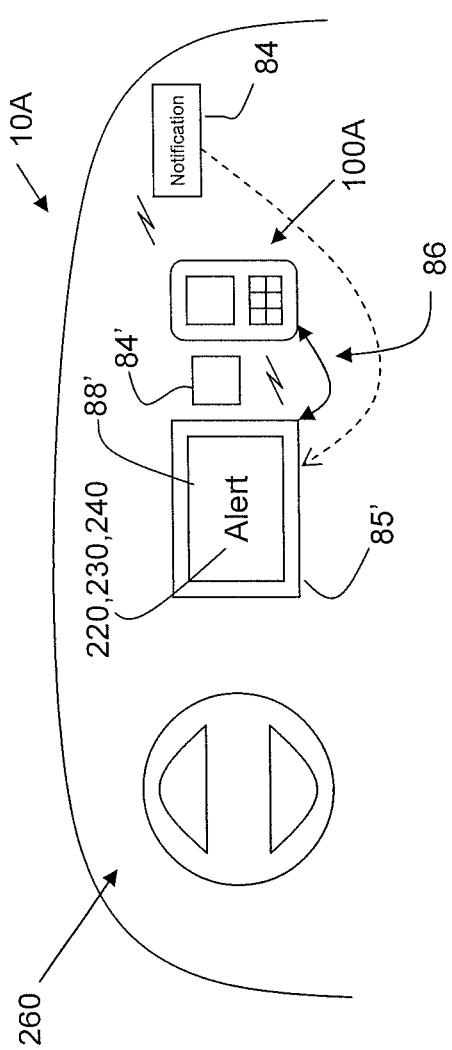
FIG. 14 is a pictorial schematic diagram showing one example configuration for the other system shown in FIG. 9.

Turning now to FIG. 14, a example of the other system 85 shown in FIG. 9 is provided. In this example, an in-vehicle navigation system 85' having a display 88', is configured to interface 86' with mobile device 100A to display alerts such as those shown in FIGS. 11-13 and 17a-17b (220, 220a, 220b, 230, 240). The mobile device 100A can interface 86' with the navigation system 85' using any available communication link such as USB, infrared, Bluetooth, custom cradle or docking station, etc. FIG. 14 illustrates that the mobile device 100A can be used to receive the notification 84, which is then converted or processed (if necessary) for use by the navigation system 85', and a copy of the notification 84', in whatever form that is appropriate, is forwarded to the navigation system 85'. It will be appreciated that the navigation system 85' in such an embodiment would require software such as a driver for detecting an incoming notification and should include a software application to enable user interactivity. Although not shown in FIG. 14, the mobile device 100A could also interface 86' with an OBD connection or other in-vehicle connection to obtain information for inclusion in the device data 78 and thus the interface 86' can provide a way to enable the vehicle's sub-systems to participate in providing information to the notification system 80 for preparing the notifications 84.

Figure 18:
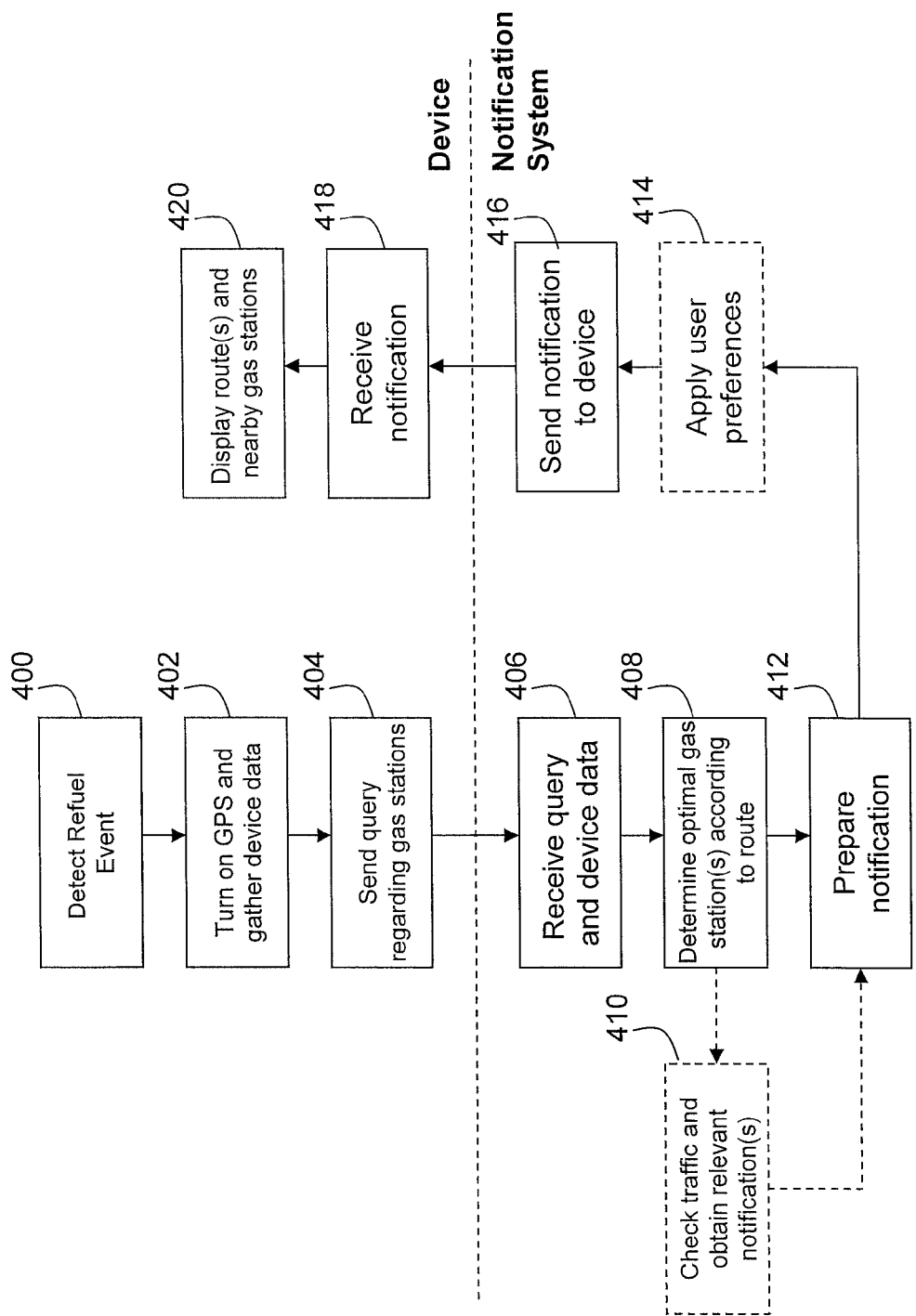
FIG. 18 is a flow diagram illustrating exemplary operations for querying gas station locations according to a detected fuel level.

If connected to other sub-systems in the vehicle 10, the mobile device 10 may also be capable of leveraging the notification system 80 and its access to third party sources 83, to provide additional alerts to the user, either individually or in combination with the traffic-related notification 84. Turning now to FIG. 18, an example illustrating a notification routine pertaining to fuel level detected in the vehicle 10 is shown. At 400, either a vehicle sub-system or the mobile device 100 (or its user), through its connection 86 to the vehicle 10 (or visual observation), detects a refuel event. The refuel event can be triggered by various criteria. For example, if a trip has been programmed into the GPS application 54, the mobile device 100 may determine that given the distance to the destination and the amount of fuel left, the vehicle 10 will need to be refuelled at least once prior to the destination. In another example, the mobile device 100 may simply detect that the vehicle's fuel level is particularly (or dangerously) low, e.g. below a predetermined threshold, and thus a refuelling is needed. Upon detecting a refuel event, the mobile device 100 may then turn on its GPS application 54 and use the traffic module 55 to gather other device data at 402. A query may then be sent at 404 pertaining to the optimal gas stations according to certain criteria such as according to deviation from the user's route, as well as other information such as fuel type (is diesel available?), preferred rest stops, preferred brands of gasoline, etc.

The notification system 80 then receives the query at 406 and, either locally or in conjunction with a third party source 83, determines gas stations in the vicinity of the programmed route or that satisfy the user's preferences, at 408. If applicable, the notification system 80 may at the same time reference the traffic database 82 to determine if a relevant notification pertaining to traffic exists at 410. A notification is then prepared at 412. As noted above, the notification prepared at 412 may comprise a notification 84 with gas station information appended or may be a separate notification pertaining only to the gas stations.

At 414, if applicable, the notification system 80 may reference the user preferences to tailor the notification 84 accordingly. For example, the user may be given the opportunity, upon registering the traffic module 55, to select the how close to their route they wish the gas stations to be, which companies they prefer, etc. Such user preferences can be applied to any variation on the procedure shown in FIG. 18. It will be appreciated that user preferences can be incorporated into any of the embodiments described herein to enable the user to specify when the notifications 84 are to be received, in what form they are to be received (e.g. email vs. SMS vs. auditory vs. through other system 85 etc.), etc.

The notification 84 is then sent to the mobile device 100 at 416 and is received at 418. In this example, the mobile device 100 would use the received notification 84 to alert the user that the fuel level is low and suggest an optimal stopping location. The locations for the gas station(s) can be displayed using the maps programs 60, routes to the gas stations can be provided, and auditory alerts can also be provided. The refuel event detection and notification routine shown in FIG. 18 is for illustrative purposes only and it can be appreciated that similar principles can be applied in providing other notifications, e.g. service stations, tow trucks, shopping areas (per user preferences), etc.

Figure 15:
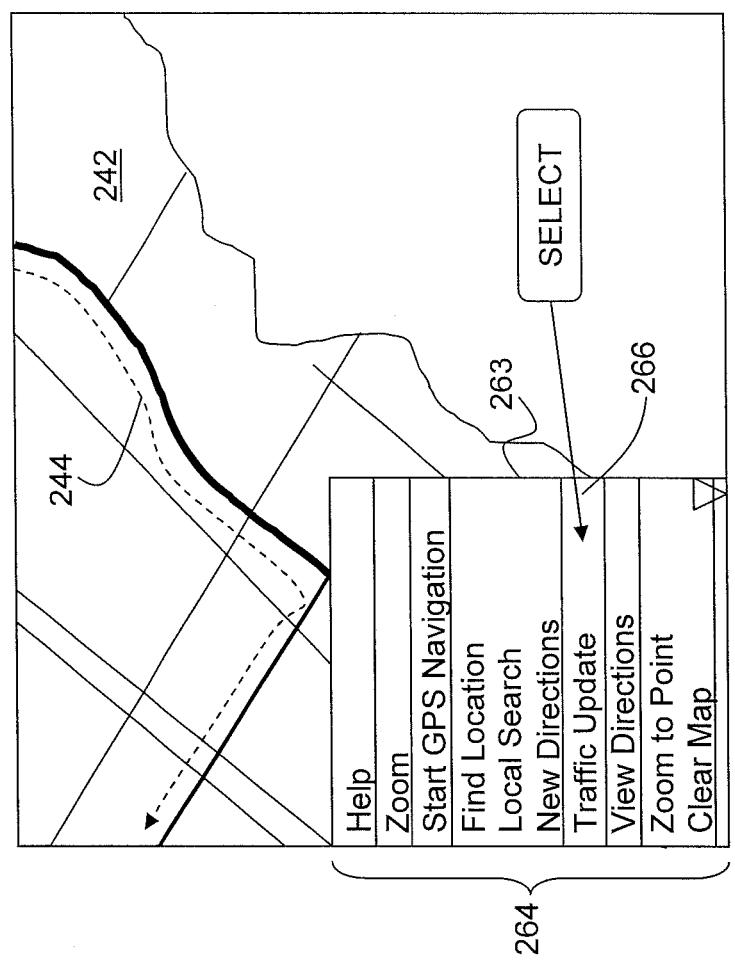
FIG. 15 is a screen shot illustrating a UI for enabling selection of a traffic update option in a menu accessed through a map application for initiating participation in a traffic notification system in one embodiment.

FIG. 15 illustrates another embodiment, where the mobile device's GPS receiver 121 is not currently on but the vehicle 10 in which the mobile device 100 currently resides enters traffic congestion, a time related trigger is set, or the user initiates the process. In these situations, a request for a traffic alert based on the current zone can be made and, at the same time, the mobile device 100 can begin contributing to the information gathering procedure performed by the notification system 80. In FIG. 15, a map 242, similar to the map shown in FIG. 13, is currently being displayed and, in this example, an intended route 244 is shown, which may have been specified by the user at some other time. It may be noted that in this example, the map program 60 is used for displaying directions but not necessarily providing current location information via the GPS application 54.

Upon receiving an appropriate input such as detecting the selection of the menu button 24, a menu 263 can be displayed that lists options 264 available within the maps program 60. Of the options 264 shown in FIG. 15, a Traffic Update option 266 can be selected. By detecting the selection of the option 266, the maps program 60 can instruct the GPS application 54 to turn on and begin sending device data 78 and receiving notifications 84. This would enable, upon entering a congested zone 2, the user to obtain a map alert 240 such as that shown in FIG. 13, which can identify the congested zone, identify a detour, etc. This also provides additional device data 78 on which the notification system 80 can make its determinations regarding the need for a particular notification in that particular zone. Accordingly, FIG. 15 illustrates that communications between the mobile devices 100 and the notification system 80 can be automatic or user-initiated in various embodiments.

Figure 16:
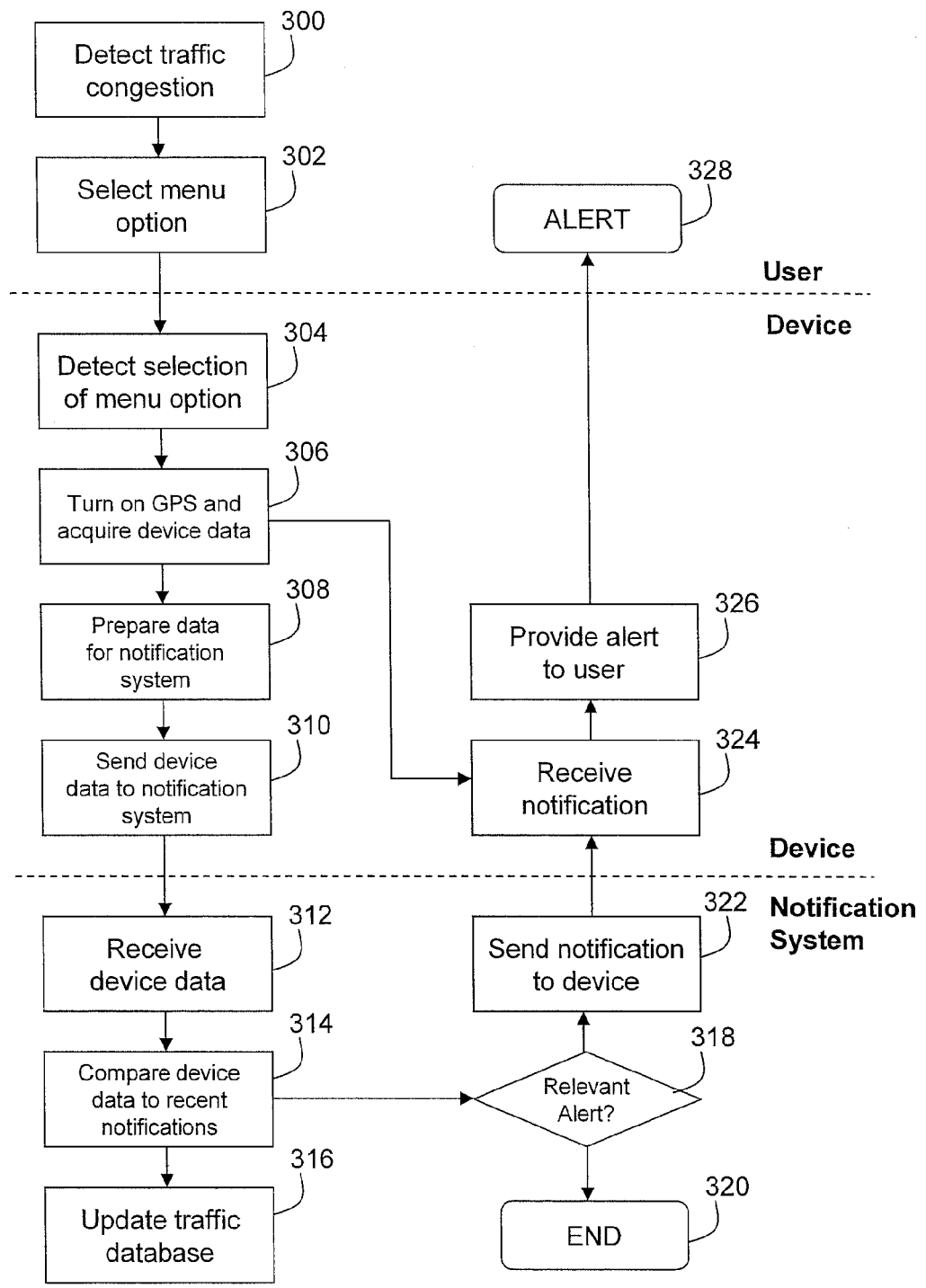
FIG. 16 is a flow diagram illustrating exemplary operations for initiating participation in a traffic notification system.

FIG. 16 illustrates an exemplary set of operations for executing the embodiment of FIG. 15. Upon detecting traffic congestion at 300, or at any other time that the user wishes to begin receiving notifications 84, the maps program 60 in this example provides the ability to initiate the menu 263 and select the Traffic Update option 266 at 302. The map program 60 would then detect selection of the Traffic Update option 266 at 304 and then turn on the GPS receiver 121 at 306 at which time it may acquire device data 78 for the mobile device 100.

It may be noted that, as shown in FIG. 16, once the GPS receiver 121 has been turned on, if the notification system 80 is configured to detect the presence of the mobile device 100 via the wireless router 26, the mobile device 100 may be immediately available to receive a notification 84 at 324 and provide an alert to the user at 326, which is experienced by the user at 328. Upon turning on the GPS receiver 121, device data 78 may be prepared at 308 for sending to the notification system 80 at 310. The notification system 80 then receives the device data 78 at 312 and may compare this device data 78 to recent notifications and other information in the traffic database 82 at 314. The traffic database 82 is also updated at 316 with the new device data 78 to contribute to the generation of notifications.

The notification system 80 determines at 318 if there is a relevant notification 84 pertaining to the zone in which the mobile device currently is and, if one is not found, the process ends at 320. If a relevant notification 84 can be found, it may then be sent to the mobile device 100 at 322, where it can be received at 324, an alert provided to the user at 326 and the alert experienced at 328.

It can therefore be seen that data 78 pertaining to the location and speed of a plurality of mobiles devices can be used to generate dynamic notifications 84 for other mobile devices 100 that may be affected by traffic issues ascertained from the data 78 provided by the plurality of mobile devices 84.

Although the above has been described with reference to certain specific embodiments, various modifications thereof will be apparent to those skilled in the art as outlined in the appended claims.

The invention claimed is:

1. A method for obtaining location based notifications, the method comprising:
   detecting an event at a mobile device located in a vehicle;
   determining location and speed data at the mobile device in response to detecting the event;
   sending the location and speed data to a notification system remote to the mobile device to enable the notification system to generate traffic notifications for the mobile device and at least one other mobile device;
   receiving a traffic notification from the notification system, the notification having been determined using the location and speed data sent by the mobile device and location and speed data obtained by the notification system from at least one other mobile device, the traffic notification including a detour; and receiving an updated traffic notification regarding a change in the traffic notification, the updated traffic notification having been determined using the location and speed data sent by the mobile device and location and speed data obtained by the notification system from the at least one other mobile device, the updated traffic notification received prior to an execution of the detour and indicative of avoiding the detour.

2. The method of claim 1, wherein the event comprises an input detected by the mobile device.

3. The method of claim 2, wherein the input comprises selection of a menu option.

4. The method of claim 1, further comprising automatically turning on a location determining application on the mobile device, to obtain the location data for the mobile device.

5. The method of claim 1, further comprising sending fuel level data for a vehicle communicable with the mobile device to the notification system.

6. The method of claim 5, wherein the fuel level data is obtained via a short range connection between an in-vehicle system and the mobile device.

7. The method of claim 5, wherein the notification comprises an indication of at least one refueling station associated with at least one criterion provided to the notification system.

8. The method of claim 7, wherein the at least one criterion comprises a route associated with the vehicle.

9. The method of claim 1, wherein the notification comprises information associated with traffic congestion in a zone associated with the location data for the mobile device.

10. The method of claim 9, wherein the mobile device is within the traffic congestion.

11. A non-transitory computer readable medium comprising computer executable instructions for obtaining location based notifications, the computer executable instructions comprising instructions for:
detecting an event at a mobile device located in a vehicle;
determining location and speed data at the mobile device in response to detecting the event;
sending the location and speed data to a notification system remote to the mobile device to enable the notification system to generate traffic notifications for the mobile device and at least one other mobile device;
receiving a traffic notification from the notification system, the notification having been determined using the location and speed data sent by the mobile device and location and speed data obtained by the notification system from at least one other mobile device the traffic notification indicative of a detour; and
receiving an updated traffic notification regarding a change in the traffic notification, the updated traffic notification having been determined using the location and speed data sent by the mobile device and location and speed data obtained by the notification system from the at least one other mobile device, the updated traffic notification received prior to an execution of the detour and indicative of avoiding the detour.

12. The non-transitory computer readable medium of claim 11, wherein the event comprises an input detected by the mobile device.

13. The non-transitory computer readable medium of claim 12, wherein the input comprises selection of a menu option.

14. The non-transitory computer readable medium of claim 11, further comprising automatically turning on a location determining application on the mobile device, to obtain the location data for the mobile device.

15. The non-transitory computer readable medium of claim 11, further comprising instructions for sending fuel level data for a vehicle communicable with the mobile device to the notification system.

16. The non-transitory computer readable medium of claim 15, wherein the fuel level data is obtained via a short range connection between an in-vehicle system and the mobile device.

17. The non-transitory computer readable medium of claim 15, wherein the notification comprises an indication of at least one refueling station associated with at least one criterion provided to the notification system.

18. The non-transitory computer readable medium of claim 17, wherein the at least one criterion comprises a route.

19. The non-transitory computer readable medium of claim 11, wherein the notification comprises information associated with traffic congestion in a zone associated with the location data for the mobile device.

20. The non-transitory computer readable medium of claim 19, wherein the mobile device is within the traffic congestion.

21. A mobile device comprising a processor, a communication interface, and memory, said memory comprising computer executable instructions for operating said processor to:
detect an event at a mobile device located in a vehicle;
determine location and speed data at the mobile device in response to detecting the event;
send the location and speed data to a notification system remote to the mobile device to enable the notification system to generate traffic notifications for the mobile device and at least one other mobile device;
receive a traffic notification from the notification system, the notification having been determined using the location and speed data sent by the mobile device and location and speed data obtained by the notification system from at least one other mobile device, the traffic notification indicative of a detour; and
receive an updated traffic notification regarding a change in the traffic notification, the updated traffic notification having been determined using the location and speed data sent by the mobile device and location and speed data obtained by the notification system from the at least one other mobile device, the updated traffic notification received prior to an execution of the detour and indicative of avoiding the detour.

* * * * *